United States Patent [19]

Bridger

[11] Patent Number: 4,613,712

[45] Date of Patent: Sep. 23, 1986

[54] ALPHA-OLEFIN POLYMERS AS LUBRICANT VISCOSITY PROPERTIES IMPROVERS

[75] Inventor: Robert F. Bridger, Hopewell, N.J.

[73] Assignee: Mobil Oil Corporation, New York, N.Y.

[21] Appl. No.: 687,699

[22] Filed: Dec. 31, 1984

[51] Int. Cl.$^4$ .............................................. C10L 1/16
[52] U.S. Cl. .................................................... 585/10
[58] Field of Search .......................................... 585/10

[56] References Cited

U.S. PATENT DOCUMENTS

| | | | |
|---|---|---|---|
| 3,135,809 | 6/1964 | Bosmajian | 502/114 X |
| 3,637,503 | 1/1972 | Giannetti et al. | 252/59 |
| 3,692,676 | 9/1972 | Culter et al. | 252/8.55 |
| 3,787,384 | 1/1974 | Stevens et al. | 502/115 X |
| 3,790,358 | 2/1974 | Rossi et al. | 44/62 |
| 3,795,616 | 3/1974 | Heilman et al. | 252/59 |
| 3,926,579 | 12/1975 | Rossi et al. | 44/62 |
| 3,943,067 | 3/1976 | Chan et al. | 502/107 |
| 3,965,018 | 6/1976 | Heilman et al. | 252/59 |
| 4,022,590 | 5/1977 | Morduchowitz et al. | 44/80 |
| 4,088,589 | 5/1978 | Rossi et al. | 252/56 |
| 4,132,663 | 1/1979 | Heilman et al. | 252/59 |
| 4,148,754 | 4/1979 | Strobel et al. | 502/108 |
| 4,173,547 | 11/1979 | Graff | 502/110 |
| 4,263,168 | 4/1981 | Rochefort et al. | 502/104 |
| 4,263,171 | 4/1981 | Shida et al. | 502/104 |
| 4,354,009 | 10/1982 | Goexe et al. | 502/154 |
| 4,358,572 | 11/1982 | Mack et al. | 526/142 |
| 4,451,574 | 5/1984 | Johnson | 502/115 |
| 4,458,058 | 7/1984 | Dombro | 526/129 |
| 4,481,301 | 11/1984 | Nowlin et al. | 502/104 |

*Primary Examiner*—Curtis R. Davis
*Attorney, Agent, or Firm*—Alexander J. McKillop; Michael G. Gilman; Stanislaus Aksman

[57] ABSTRACT

Lubricating oil compositions having improved viscosity properties, such as viscosity index, are produced by combining with a lubricant a viscosity index-improving amount of an atactic polymer of $C_5$–$C_{22}$ alpha-olefins prepared by polymerizing at least one $C_5$–$C_{22}$ alpha-olefin monomer in the presence of a highly active olefin-polymerization catalyst. Also disclosed is a process for the preparation of the atactic polymers, which can be homopolymers of copolymers of $C_5$–$C_{22}$ alpha olefins.

61 Claims, 1 Drawing Figure

ALPHA-OLEFIN POLYMERS AS LUBRICANT VISCOSITY PROPERTIES IMPROVERS

BACKGROUND OF THE INVENTION

I. Field of the Invention

This invention relates to alpha-olefin polymers used as lubricant viscosity index improvers. The invention is also directed to lubricant compositions containing at least one alpha-olefin polymer of the present invention.

II. Description of the Related Art

It is well known in the art that the viscosity of lubricating oils decreases with increasing temperature. A commonly-used measure of the change of the viscosity of the oil with the temperature is an empirical quantity called viscosity index. The viscosity index (VI) for any given oil is derived by measuring the viscosity of the oil at 40° C. and 100° C. and then calculating the viscosity index from detailed tables published by the ASTM (ASTM Standard D 2270). Generally, oils having a viscosity index of about 80 or 90 are desirable for practical applications. Such oils are composed usually of saturated paraffinic and alicyclic hydrocarbons which provide long life, freedom from sludge and varnish and perform satisfactorily when combined with specific additives for a given practical application (e.g., see Kirk-Othmer "Encyclopedia of Chemical Technology", Third Edition, John Wiley and Sons, 1981, Volume 14, pages 488–491).

Additives used to improve the viscosity index of a given oil are also well known in the art. Such additives are commonly produced from polyisobutylenes, polymethacrylates and polyalkylstyrenes, and they are used in the molecular weight range of about 45,000 to about 1,700,000. Viscosity index improvers appear to function primarily by increasing the viscosity of a given lubricating oil without changing the original viscosity-temperature coefficient or relationship. The use of such VI improvers is of particular importance in petroleum oils whose lower viscosity fractions from a petroleum crude have by far the lowest viscosity-temperature coefficients. The thickening effect of the additive can produce an oil having a viscosity index of 50 units or more above the value obtained with a higher molecular-weight fraction from the same crude. In addition to polyisobutylenes, polymethacrylates and polyalkylstyrenes, polymerized alpha-olefin polymers have also been used in the past for improving the viscosity properties of lubricating oils. For example, Heilman et al, U.S. Pat. No. 3,795,616, teach the preparation of isotactic alpha-olefin polymers prepared from straight or branched chain alpha-olefin monomers having from 5 to 12 carbon atoms. The polymers are prepared by polymerizing the monomer in the presence of a Ziegler-Natta type catalyst which is useful for the polymerization of propylene. Particularly useful are catalysts containing titanium and vanadium salts in conjunction with aluminum alkyls and alkyl chlorides.

Heilman et al, U.S. Pat. No. 3,965,018, disclose a process for preparing a concentrate of a poly-alpha-olefin in a lubricating oil base, comprising conditioning a previously-hydrotreated lube oil base stock in the presence of hydrogen and a Ziegler-Natta catalyst. Subsequently, a higher alpha-olefin, such as alpha-olefin of 6 to 20 carbon atoms or a mixture of alpha-olefins of 6 to 12 carbon atoms and 16 to 20 carbon atoms, is polymerized in the conditioned, hydrotreated oil.

Heilman et al, U.S. Pat. No. 4,132,663, disclose the preparation of pour point depressants for a lubricating oil, comprising copolymerizing 1-hexene and 1-octadecene in the presence of a Ziegler-Natta catalyst.

Giannetti et al, U.S. Pat. No. 3,637,503, disclose lubricating oil compositions having good shear stability obtained by blending a mineral lubricating oil and a viscosity-index improving amount of a polymer of a normal alpha-olefin having 4 to 16 carbon atoms per molecule. The polymers are prepared in the presence of aluminum chloride catalyst at a temperature of about −40° to about +70° F.

Culter et al, U.S. Pat. No. 3,692,676, and Mack et al, U.S. Pat. No. 4,358,572, disclose methods of reducing friction loss of non-aqueous petroliferous liquids by adding to the liquids alpha-olefin polymers prepared by polymerizing alpha-olefin monomers of 6 to 20 carbon atoms in the presence of Ziegler-Natta catalysts.

Rossi et al, U.S. Pat. No. 3,790,358, Rossi et al, U.S. Pat. No. 3,926,579, Morduchowitz et al, U.S. Pat. No. 4,022,590 and Rossi et al, U.S. Pat. No. 4,088,589, disclose the use of higher alpha-olefin copolymers in lubricating compositions for a variety of purposes.

However, a need still exists in the art for an effective viscosity-index improving composition which can be used in very small amounts in a lubricating oil composition to improve the viscosity characteristics of the lubricating oil composition.

SUMMARY OF THE INVENTION

A lubricating oil composition comprises a major proportion of a lubricant and a minor, viscosity index-improving amount of an atactic polymer or copolymer of $C_5$-$C_{22}$ linear alpha-olefins. The polymer is prepared by polymerizing at least one $C_5$-$C_{22}$ linear alpha-olefin in the presence of a highly active olefin-polymerization catalyst. The highly active catalyst is prepared in a process comprising the following steps:

(i) A solid, porous carrier having reactive OH groups is contacted with a liquid in the absence of ball milling, the liquid containing at least one organomagnesium composition having the empirical formula $$R_n MgR'_{(2-n)} \qquad (I)$$

where R is unsubstituted $C_1$-$C_{12}$ alkyl, R' is chlorine, bromine or iodine, and n is a rational number from about 0.5 to 2, the number of moles of the organomagnesium composition being in excess of the number of moles of the OH groups on the carrier, whereby the organomagnesium composition is reacted with the OH groups on the carrier.

(ii) The liquid from step (i) is evaporated to precipitate magnesium onto the carrier. The precipitated magnesium is selected from the group of magnesium dihalide, unreacted organomagnesium and mixtures thereof. The evaporation produces a supported magnesium composition in the form of a dry, free flowing powder.

(iii) The powder of step (ii) is then reacted with at least one tetravalent titanium compound in a liquid medium, the number of moles of the tetravalent titanium compound being in excess of the number of the OH groups on the carrier prior to the reaction with the organomagnesium composition in step (i). The tetravalent titanium compound is soluble in the liquid medium, while the supported magnesium composition is substantially insoluble in the liquid medium. As a result of this step (iii), a reacted form of titanium insoluble in the liquid medium also becomes supported on the carrier.

BRIEF DESCRIPTION OF THE FIGURE

The FIGURE is a graphical representation of the experimental data of Examples 2–4.

DETAILED DESCRIPTION OF THE INVENTION

Figure 1:
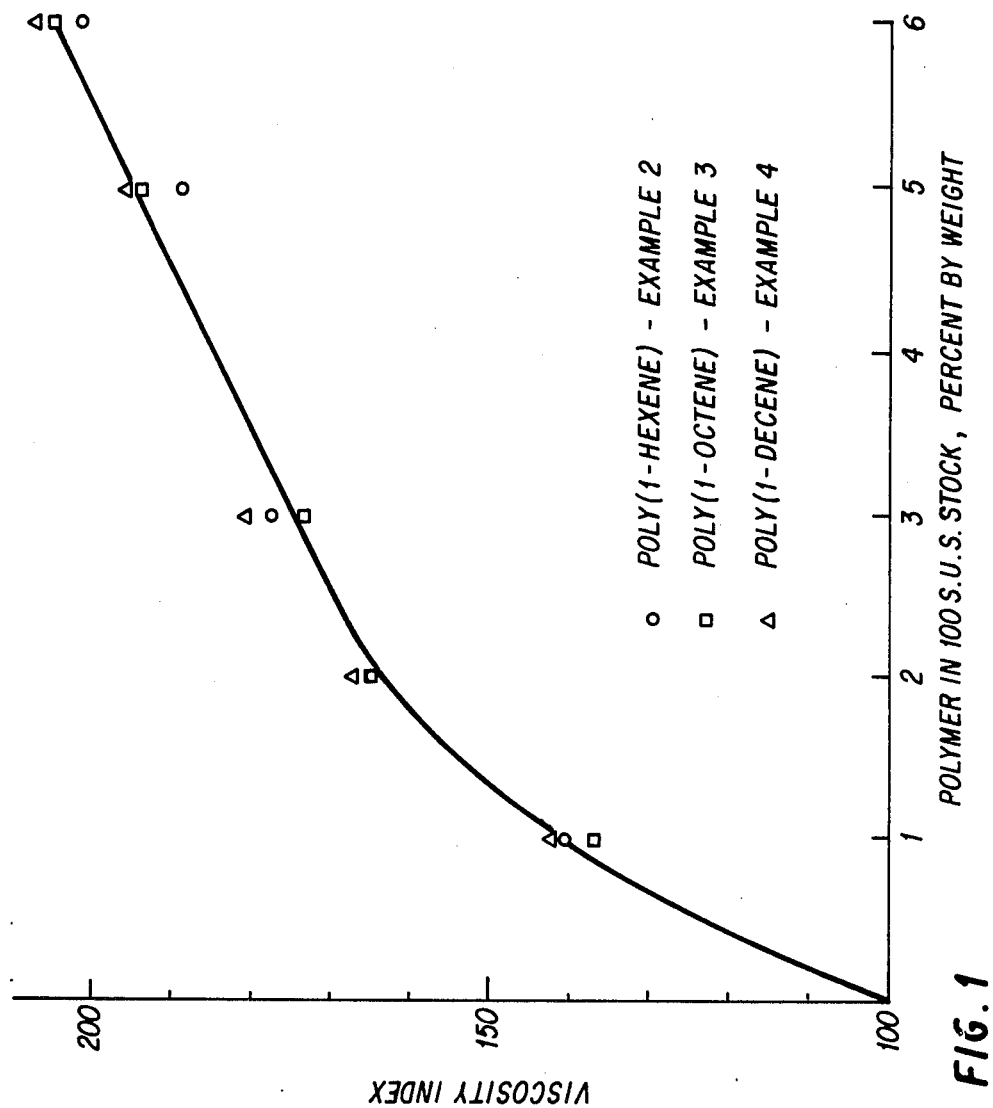

The $C_5$–$C_{22}$ alpha-olefin monomers used to prepare viscosity index improvers of the present invention are any alpha-olefin monomers containing a single double bond in the alpha-position. Suitable monomers are 1-pentene, 1-hexene, 1-heptene, 1-octene, 1-nonene, 1-decene, 1-undecene, 1-dodecene, 1-tetradecene, 1-hexadecene, 1-octadecene and 1-eicosene. In a preferred embodiment, the monomers used to prepare the viscosity-index-improved composition of the present invention are $C_6$–$C_{16}$ linear or branched alpha-olefins. Preferred linear alpha-olefins are 1-hexene, 1-heptene, 1-octene, 1-nonene, 1-decene, 1-undecene, 1-dodecene, 1-tetradecene and 1-hexadecene. If branched olefins are used, their paraffin side chains must be removed by at least four carbon atoms from the terminal olefinic carbon atom. Thus, suitable branched alpha-olefins are 4-methylpentene, 4- or 5-methylhexenes, 4- or 5-ethyl-hexenes and 4-, 5- or 6-methylheptenes. The viscosity index-improving polymers of the present invention can be homopolymers of any one linear or branched-chain alpha-olefin monomer, or copolymers of any two or more of such monomers. The polymers of the most preferred embodiment are homopolymers of 1-hexene, 1-octene or 1-decene.

The alpha-olefins are generally commercially available from one or more of the following reactions: cracking of wax, Fischer-Tropsch conversion of syngas to olefins, and controlled oligomerization of ethylene with Ziegler-Natta catalysts, such as disclosed, for example, by A. W. Langer, Jr., *Journal of Macromolecular Science*, Volume A4, pp. 775–787 (July, 1970), and U.S. Pat. Nos. 3,647,912; 3,655,812; 3,662,021; 4,409,409; and 4,410,750.

The index-improving additives of the present invention are prepared in the presence of an active olefin-polymerization catalyst composition disclosed by Nowlin et al, U.S. Pat. No. 4,481,301, the entire contents of which are incorporated herein by reference. Briefly, such a catalyst composition is prepared by reacting a solid, porous carrier having reactive OH groups with an organomagnesium composition of the formula:

$$R_n MgR'_{(2-n)} \tag{I}$$

where R is unsubstituted $C_1$–$C_{12}$ alkyl, R' is chlorine (Cl), bromine (Br) or iodine (I), and n is a rational number from about 0.5 to 2. The number of moles of the organomagnesium composition must be in excess of the number of moles of the OH groups on the carrier. Subsequently, the liquid solvent from the first step of the catalyst synthesis is gently removed from the reaction mixture, such as by evaporation, so that substantially all of the magnesium species, e.g., magnesium dihalides, unreacted organomagnesium composition and mixtures thereof, are retained on the carrier. In the last step of the synthesis, the product of the second step of the catalyst synthesis is reacted with so much of at least one tetravalent titanium compound that the number of moles of the tetravalent titanium compound is in excess of the number of the OH groups on the carrier prior to the reaction thereof with the organomagnesium composition. The solid carrier, used in the catalyst synthesis, is preferably heated at a temperature of at least 500° C. for at least four hours prior to the contact thereof with the organomagnesium composition. The ratio of the number of moles of the organomagnesium composition to the number of moles of the OH groups on the carrier, which is preferably silica, is preferably about 1.1 to about 2.5, and most preferably about 1.5 to about 2.5.

The polymerization of alpha-olefin monomers in the presence of such an active olefin-polymerization catalyst produces substantially atactic polymers of alpha-olefins which are, surprisingly, better viscosity index-improvers than the isotatic polymers of prior art. The product of the polymerization reaction comprises at least 60% wt., preferably about 80 to about 100% wt. of atactic polymers. For example, the addition of about 5% by weight of the polymers of the present invention to a lubricating oil composition results in a viscosity index improvement of about 94 to about 100 VI units. In contrast, the addition of polymers prepared with Ziegler-Natta catalysts of the prior art, similar to those disclosed by Heilman et al in U.S. Pat. No. 3,795,616, in the same amount to a lubricating oil composition results in an improvement in viscosity index of about 63 VI units.

The reason or reasons for improved viscosity index properties of the polymers of the present invention are not clear. However, it is speculated, without wishing to be bound by any theory of operability, that the atactic polymers, produced in the process of the present invention are superior viscosity index improvers than similar isotactic polymers. In addition, as discussed in detail below, double bond migration, which has been reported to be a complication in conventional Ziegler-Natta polymers of the prior art, occurs to a very small extent, if any, with the highly active catalyst used in the polymerization process of the present invention.

The polymerization may be conducted in a slurry reactor at a temperature of about 0° to about 150° C., preferably at about 25° to about 90° C., at a pressure of about 15 psig to about 1500 psig, preferably about 70° C. to about 90° C. for about 15 to about 600 minutes, preferably 20 to about 40 minutes. Preferably the reaction mixture is stirred during the course of the reaction to aid in the polymerization of the monomers. The average molecular weight of the polymers of the present invention ranges from about 30,000 to about 1,000,000.

The molecular weight of the product polymer is controlled by any of the well-known methods of regulating the molecular weight of polymers, such as temperature adjustment or hydrogen pressure. The polymerization is conducted in a suitable solvent, such as hexane, or any of the other solvents disclosed by Nowlin et al in U.S. Pat. No. 4,481,301.

The high quality, multi-viscosity grade lubricating oil is obtained in accordance with this invention by combining a lubricating oil composition, either derived from natural petroleum sources or synthetic lubricating oil compositions, with 0.2 to 12%, preferably 0.5 to 5% by weight of the viscosity index improving composition of the present invention.

The following Examples further illustrate the essential features of the invention. However, it will be apparent to those skilled in the art that the specific reactants and reaction conditions used in the Examples do not limit the scope of the invention.

EXAMPLE 1

[Synthesis of Catalyst]

First Step:

730 grams of Davison silica gel, Grade 952 (a trademark of and available from the Davison Chemical Division of W. R. Grace and Company, Baltimore, Md.), heated at 800° C. in the atmosphere of dry nitrogen for about twelve hours, was placed into a flask containing 6,000 ml of dry hexane. The silica/hexane slurry was brought to reflux and 425 ml of ethylmagnesium chloride (1.7 molar in tetrahydrofuran, THF) was added dropwise to the refluxing solution. The reflux was continued for one hour, then the solvents were removed by distillation to produce a free-flowing powder. The free-flowing powder was dried at 73° C. for 3.4 hours by passing a hydrogen ($H_2$) sweep gas at 10 psi through the flask.

Second Step:

243 mls of titanium tetrachloride, $TiCl_4$, was added to 6,000 mls of dry heptane at 45° C. and the solution was heated to the temperature of 75° C. This solution was then added to the entire quantity of the product of the first step, obtained above. The resulting slurry was heated to 95° C. and maintained at that temperature under agitation for one hour. The slurry was then cooled to the temperature of less than 40° C. and the agitation was stopped.

The catalyst product was allowed to settle to the bottom of the flask. The heptane/$TiCl_4$ solution was decanted off the top of the flask. The solid remaining at the bottom of the flask was washed six times with 2,000 ml each of isopentane to remove any unreacted $TiCl_4$. The washed product was heated to 100° C. over the period of 3.2 hours and maintained at that temperature for one hour. The catalyst product was then cooled to room temperature and weighed. Yield: 895 grams of the catalyst containing, in theory, 0.80 mmol of Mg per gram.

All experimental procedures were performed under inert conditions. Hexane and heptane were dried over sodium and freshly distilled prior to use.

The hydroxyl content of Davison Grade 952 silica was not measured but was estimated to have been between about 0.40–0.60 mmols/gr, based on the analysis of similar silicas.

EXAMPLE 2

[Preparation of Poly (1-Hexene)]

6 ml of a 25% by weight (% wt) solution in hexane of triethylaluminum activator, containing 9 millimoles (mmol) of the activator, was added to a slurry of the catalyst of Example 1 in hexene at 25° C. under a blanket of dry argon in a glass reactor equipped with an overhead stirrer. The catalyst slurry was comprised of 2 grams (gr) of the catalyst, containing 3 mmol of Ti and 1.8 mmol of Mg, in 100 g (1.188 mmol) of hexene.

Upon addition of the triethylaluminum the temperature rose to 70° C. and external cooling was provided by means of a water bath. The reacting solution was maintained at 65° C. to 70° C. with stirring for 30 minutes, until it became too viscous to stir. 250 ml of hexane was added, followed by 5 ml of 2-propanol and then 5 ml of water. After stirring at 60° C. for 30 minutes, 10 gr of anhydrous sodium sulfate was added and the mixture was stirred an additional 30 minutes, then filtered while hot through a bed of Celite filter aid. The solvent was stripped by rotary evaporation and the last traces of unreacted monomer and solvent were removed by vacuum distillation at 0.1 mm Hg and 150° C. The yield of polymer obtained was 66 g, with 18 g remaining in the filter flask and 5 g in the filter cake. Carbon-13 NMR analysis showed the material to consist entirely of atactic poly(1-hexene).

EXAMPLE 3

[Preparation of Poly (1-Octene)]

Poly (1-octene) was prepared in a polymerization method similar to that of Example 2, except that 100 gr of 1-octene was used in the synthesis. The yield of poly(1-octene) was 62 gr.

EXAMPLE 4

[Preparation of Poly (1-Decene)]

Poly (1-decene) was prepared in a polymerization method similar to that of Example 2, except that 100 gr of 1-decene was used in the synthesis. The yield of poly(1-decene) was 60 gr.

The weight average molecular weights and the degree of polymerization of the polymers of Examples 2–4 is set forth in Table 1, below.

TABLE 1

| | Molecular Weights of Poly(1-alkenes) | | | |
|---|---|---|---|---|
| Example | Monomer | $\overline{M_w}$* | $\overline{M_n}$* | $\overline{M_w}/\overline{M_n}$ | Degree of Polymerization** |
| 2 | 1-Hexene | 160,000 | 17,600 | 9.1 | 1,895 |
| 3 | 1-Octene | 186,000 | 15,900 | 11.7 | 1,658 |
| 4 | 1-Decene | 206,000 | 22,700 | 9.1 | 1,469 |

*Weight average ($\overline{M_w}$) and number average ($\overline{M_n}$) molecular weights are styrene equivalent molecular weights by gel permeation chromatography.
**$\overline{M_w}$/mol. wt. of monomer.

The least reactive of the three monomers used in Examples 2–4 was 1-decene, and the most reactive was 1-hexene. 7% of unreacted monomer was isolated from the polymerization of 1-decene. Double bond migration has been reported a complication in other Ziegler-Natta catalyst systems [e.g., see Marvel et al; *Journal of Polymer Science*, 49, pp. 335–352, 1961; Aubrey et al., *Journal of Polymer Science, Part A-1*, 4, pp. 1709–1726, 1966; and Aubrey et al, *Journal of Polymer Science*, Part A-1, 5, pp. 1191–1201(1967)] which leads to loss of reactive 1-olefin and the formation of unreactive E-2-olefin, accompanied by serious loss of yield. For that reason, the unreacted 1-decene was examined by carbon-13 NMR to determine the extend of double bond migration. Less than 1% of other olefins was detected, in contrast to the high degree of isomerization observed during 1-octadecene polymerization with the aforementioned previously-used Ziegler-Natta catalyst compositions (e.g., see the articles of Marvel et al and Aubrey et al, 1967). Thus, the catalyst used herein has considerably less tendency to promote double bond migration than such other Ziegler-Natta catalysts.

EXAMPLE 5

[Viscosity-Modifying Properties of Poly-(1-alkenes)]

The viscosity-modifying properties of the α-olefin polymers of Examples 2–4 were tested by adding 5% wt of each polymer to a solvent-refined paraffinic neutral 100 S.U.S. basestock, and measuring the kinematic viscosity of the resulting lubricant composition at 40° C. and 100° C. The viscosity index for each lubricant composition was then determined from these measurements. The results are summarized in Table 2 and in the FIGURE.

TABLE 2

Effect of Polymers of Higher Alpha Olefins on Viscosity of 100 s.u.s. Basestock

| Polymer (5% wt.) | Kinematic Viscosity, cs | | Viscosity Index |
|---|---|---|---|
| | 40° C. | 100° C. | |
| Poly(1-hexene) | 100.51 | 17.19 | 187.5 |
| Poly(1-octene) | 100.01 | 17.52 | 192.9 |
| Poly(1-decene) | 98.93 | 17.43 | 193.7 |
| None | 22.16 | 4.26 | 93.5 |

As the data of Table 2 indicates, oil thickening properties of the polymers were excellent, with 5% wt. of the polymer providing a four-fold increase in viscosity at 100° C. for all three poly(1-alkenes). The VI improvement at 5% dosage was 100 in all cases, raising the 100 SUS basestock to the 10W40 range.

Response of VI to the concentration of polymer is summarized in the FIGURE. In the 0 to 2% range, VI increases very rapidly, leveling off above 2% to a benefit of 10.5 VI units for each percent of polymer.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

I claim:

1. A lubricating composition comprising a major proportion of a lubricant and a viscosity index (VI) improving amount of an atactic polymer of at least one $C_5$–$C_{22}$ alpha-olefin, prepared by polymerizing at least one $C_5$–$C_{22}$ alpha-olefin monomer in the presence of a catalyst prepared by a process comprising the steps of:
   (1) contacting a solid, porous carrier having reactive OH groups with a liquid in the absence of ball milling, said liquid containing at least one organomagnesium composition having the empirical formula

$$R_n MgR'_{(2-n)} \qquad (I)$$

where R is unsubstituted $C_1$–$C_{12}$ alkyl, R' is Cl, Br or I, and n is a rational number from about 0.5 to 2, the number of moles of said organomagnesium composition being in excess of the number of moles of said OH groups on said carrier, whereby said organomagnesium composition is reacted with said OH groups on said carrier;
   (ii) evaporating said liquid from step (i) to precipitate magnesium onto said carrier, said precipitated magnesium being selected from the group consisting of magnesium dihalide, unreacted organomagnesium composition and mixtures thereof, whereby a supported magnesium composition in the form of a dry, free-flowing powder is formed; and
   (iii) reacting said powder of step (ii) with at least one tetravalent titanium compound in a liquid medium, the number of moles of said tetravalent titanium compound being in excess of the number of the OH groups on said carrier prior to reaction with said organomagnesium composition in step (i), said tetravalent titanium compound being soluble in said liquid medium, and said supported magnesium composition being substantially insoluble in said liquid medium, whereby a reacted form of titanium which is insoluble in said liquid medium becomes supported on said carrier.

2. A composition of claim 1 wherein the atactic polymer is a polymer of at least one $C_6$–$C_{16}$ alpha-olefin monomer.

3. A composition of claim 2 wherein the polymerization is carried out at the temperature of about 0° to about 150° C.

4. A composition of claim 3 wherein the polymerization is carried out at the temperature of about 25° to about 70° C.

5. A composition of claim 4 which comprises about 0.2% to about 12% by weight of the atactic polymer.

6. A composition of claim 5 whose viscosity index is improved by about 94 to about 100 VI units by the addition of the atactic polymer.

7. A composition of claim 6 wherein the atactic polymer has a molecular weight of about 30,000 to about 1,000,000.

8. A composition of claim 7 wherein the atactic polymer is poly(1-hexene).

9. A composition of claim 7 wherein the atactic polymer is poly(1-octene).

10. A composition of claim 7 wherein the atactic polymer is poly(1-decene).

11. A composition of claim 8 wherein the solid, porous carrier of said catalyst is silica which has been heated at a temperature of at least about 500° C. for at least 4 hours prior to step (i).

12. A composition of claim 11 wherein in step (i), the ratio of the number of moles of said organomagnesium composition to the number of moles of said OH groups on said silica is about 1.1 to about 2.5.

13. A composition of claim 12 wherein, in step (i), the ratio of the number of moles of said organomagnesium composition to the number of moles of said OH groups on said silica is about 1.5 to about 2.5.

14. A composition of claim 9 wherein the solid, porous carrier of said catalyst is silica which has been heated at a temperature of at least about 500° C. for at least 4 hours prior to step (i).

15. A composition of claim 14 wherein, in step (i), the ratio of the number of moles of said organomagnesium composition to the number of moles of said OH groups on said silica is about 1.1 to about 2.5.

16. A composition of claim 15 wherein, in step (i), the ratio of the number of moles of said organomagnesium composition to the number of moles of said OH groups on said silica is about 1.5 to about 2.5.

17. A composition of claim 10 wherein the solid, porous carrier of said catalyst is silica which has been heated at a temperature of at least about 500° C. for at least 4 hours prior to step (i).

18. A composition of claim 17 wherein, in step (i), the ratio of the number of moles of said organomagnesium composition to the number of moles of said OH groups on said silica is about 1.1 to about 2.5.

19. A composition of claim 18 wherein, in step (i), the ratio of the number of moles of said organomagnesium composition to the number of moles of said OH groups on said silica is about 1.5 to about 2.5.

20. A method of improving the viscosity characteristics of a lubricating oil composition, comprising adding to the oil composition a viscosity index improving amount of an atactic polymer of at least one $C_5-C_{22}$ alpha-olefin which is prepared by polymerizing at least one $C_5-C_{22}$ alpha-olefin monomer in the presence of a catalyst prepared by a process comprising the steps of:
(1) contacting a solid, porous carrier having reactive OH groups with a liquid in the absence of ball milling, said liquid containing at least one organomagnesium composition having the empirical formula

$$R_nMgR'_{(2-n)} \qquad (I)$$

where R is unsubstituted $C_1-C_{12}$ alkyl, R' is Cl, Br or I, and n is a rational number from about 0.5 to 2, the number of moles of said organomagnesium composition being in excess of the number of moles of said OH groups on said carrier, whereby said organomagnesium composition is reacted with said OH groups on said carrier;
(ii) evaporating said liquid from step (i) to precipitate magnesium onto said carrier, said precipitated magnesium being selected from the group consisting of magnesium dihalide, unreacted organomagnesium composition and mixtures thereof, whereby a supported magnesium composition in the form of a dry, free-flowing powder is formed; and
(iii) reacting said powder of step (ii) with at least one tetravalent titanium compound in a liquid medium, the number of moles of said tetravalent titanium compound being in excess of the number of the OH groups on said carrier prior to reaction with said organomagnesium composition in step (i), said tetravalent titanium compound being soluble in said liquid medium, and said supported magnesium composition being substantially insoluble in said liquid medium, whereby a reacted form of titanium which is insoluble in said liquid medium becomes supported on said carrier.

21. A composition of claim 7 wherein the atactic polymer has a weight average molecular weight of about 160,000 to about 210,000.

22. A composition of claim 21 wherein the atactic polymer has a number average molecular weight of about 15,500 to about 23,000.

23. A method of claim 20 wherein the atactic polymer is a polymer of at least one $C_6-C_{16}$ alpha-olefin monomer.

24. A method of claim 23 wherein the polymerization is carried out at the temperature of about 0° to about 150° C.

25. A method of claim 24 wherein the polymerization is carried out at the temperature of about 25° to about 70° C.

26. A method of claim 25 wherein about 0.2% to about 12% by weight of the atactic polymer is added to the oil composition.

27. A method of claim 26 wherein the viscosity index of the resulting lubricating oil composition is improved by the addition of the atactic polymer by about 94 to about 100 VI units.

28. A method of claim 27 wherein the atactic polymer has a molecular weight of about 30,000 to about 1,000,000.

29. A method of claim 28 wherein the atactic polymer has a weight average molecular weight of about 160,000 to about 210,000.

30. A method of claim 29 wherein the atactic polymer has a number average molecular weight of about 15,500 to about 23,000.

31. A method of claim 30 wherein the atactic polymer is poly (1-hexene).

32. A method of claim 30 wherein the atactic polymer is poly(1-octene).

33. A method of claim 30 wherein the atactic polymer is poly(1-decene).

34. A method of claim 31 wherein the solid, porous carrier of said catalyst is silica which has been heated at a temperature of at least about 500° C. for at least 4 hours prior to step (i).

35. A method of claim 34 wherein in step (i), the ratio of the number of moles of said organomagnesium composition to the number of moles of said OH groups on said silica is about 1.1 to about 2.5.

36. A method of claim 35 wherein, in step (i), the ratio of the number of moles of said organomagnesium composition to the number of moles of said OH groups on said silica is about 1.5 to about 2.5.

37. A method of claim 32 wherein the solid, porous carrier of said catalyst is silica which has been heated at a temperature of at least about 500° C. for at least 4 hours prior to step (i).

38. A method of claim 37 wherein, in step (i), the ratio of the number of moles of said organomagnesium composition to the number of moles of said OH groups on said silica is about 1.1 to about 2.5.

39. A method of claim 38 wherein, in step (i), the ratio of the number of moles of said organomagnesium composition to the number of moles of said OH groups on said silica is about 1.5 to about 2.5.

40. A method of claim 33 wherein the solid, porous carrier of said catalyst is silica which has been heated at a temperature of at least about 500° C. for at least 4 hours prior to step (i).

41. A method of claim 40 wherein, in step (i), the ratio of the number of moles of said organomagnesium composition to the number of moles of said OH groups on said silica is about 1.1 to about 2.5.

42. A method of claim 41 wherein, in step (i), the ratio of the number of moles of said organomagnesium composition to the number of moles of said OH groups on said silica is about 1.5 to about 2.5.

43. An atactic liquid polymer of at least one $C_5-C_{22}$ alpha-olefin prepared by polymerizing the alpha-olefin monomer in the presence of a catalyst composition prepared by a process comprising the steps of:
(i) contacting a solid, porous carrier having reactive OH groups with a liquid in the absence of ball milling, said liquid containing at least one organomagnesium composition having the empirical formula

$$R_nMgR'_{(2-n)} \qquad (I)$$

where R is unsubstituted $C_1-C_{12}$ alkyl, R' is Cl, Br or I, and n is a rational number from about 0.5 to 2, the number of moles of said organomagnesium composition being in excess of the number of moles of said OH groups on said carrier, whereby said organomagnesium composition is reacted with said OH groups on said carrier;
(ii) evaporating said liquid from step (i) to precipitate magnesium onto said carrier, said precipitated magnesium being selected from the group consisting of magnesium dihalide, unreacted organomagnesium composition and mixtures thereof, whereby a supported magnesium composition in the form of a dry, free-flowing powder is formed; and (iii) reacting said powder of step (ii) with at least one tetravalent titanium compound in a liquid medium, the number of moles of said tetravalent titanium compound being in excess of the number of the OH groups on said carrier prior to reaction with said organomagnesium composition in step (i), said tetravalent titanium compound being soluble in said liquid medium, and said supported magnesium composition being substantially insoluble in said liquid medium, whereby a reacted from of titanium which is insoluble in said liquid medium becomes supported on said carrier.

44. A polymer of claim 43 wherein the atactic polymer is a polymer of at least one $C_6$–$C_{16}$ alpha-olefin monomer.

45. A polymer of claim 44 wherein the polymerization is carried out at the temperature of about 0° to about 150° C.

46. A polymer of claim 45 wherein the polymerization is carried out at the temperature of about 25° to about 70° C.

47. A polymer of claim 46 which has a molecular weight of about 30,000 to about 1,000,000.

48. A polymer of claim 47 which has a weight average molecular weight of about 160,000 to about 210,000.

49. A polymer of claim 48 which has a number average molecular weight of about 15,500 to about 23,000.

50. A polymer of claim 49 which is poly(1-hexene).

51. A polymer of claim 49 which is poly(1-octene).

52. A polymer of claim 49 which is poly(1-decene).

53. A polymer of claim 50 wherein the solid, porous carrier of said catalyst is silica which has been heated at a temperature of at least about 500° C. for at least 4 hours prior to step (i).

54. A polymer of claim 53 wherein, in step (i), the ratio of the number of moles of said organomagnesium composition to the number of moles of said OH groups on said silica is about 1.1 to about 2.5.

55. A polymer of claim 54 wherein, in step (i), the ratio of the number of moles of said organomagnesium composition to the number of moles of said OH groups on said silica is about 1.5 to about 2.5.

56. A polymer of claim 51 wherein the solid, porous carrier of said catalyst is silica which has been heated at a temperature of at least about 500° C. for at least 4 hours prior to step (i).

57. A polymer of claim 56 wherein, in step (i), the ratio of the number of moles of said organomagnesium composition to the number of moles of said OH groups on said silica is about 1.1 to about 2.5.

58. A polymer of claim 57 wherein, in step (i), the ratio of the number of moles of said organomagnesium composition to the number of moles of said OH groups on said silica is about 1.5 to about 2.5.

59. A polymer of claim 52 wherein the solid, porous carrier of said catalyst is silica which has been heated at a temperature of at least about 500° C. for at least 4 hours prior to step (i).

60. A polymer of claim 59 wherein, in step (i), the ratio of the number of moles of said organomagnesium composition to the number of moles of said OH groups on said silica is about 1.1 to about 2.5.

61. A polymer of claim 60 wherein, in step (i), the ratio of the number of moles of said organomagnesium composition to the number of moles of said OH groups on said silica is about 1.5 to about 2.5.

* * * * *